US009507376B2

(12) United States Patent  
Kontkanen et al.

(10) Patent No.: US 9,507,376 B2
(45) Date of Patent: Nov. 29, 2016

(54) OVERLAPPING DISPLAYS (75) Inventors: Mikael Kontkanen, Ilmarinen (FI); Jussi Ropo, Turku (FI); Pasi Tuomo Antero Kemppinen, Tampere (FI); Vicente Calvo Alonso, Piispanristi (FI)

(73) Assignee: Nokia Technologies Oy, Espoo (FI)

( * ) Notice: Subject to any disclaimer, the term of this patent is extended or adjusted under 35 U.S.C. 154(b) by 210 days.

(21) Appl. No.: 13/325,294

(22) Filed: Dec. 14, 2011

(65) Prior Publication Data
US 2013/0155598 A1 Jun. 20, 2013

(51) Int. Cl.
G06F 1/16 (2006.01)
H04M 1/02 (2006.01)

(52) U.S. Cl.
CPC ......... *G06F 1/1616* (2013.01); *G06F 1/1624* (2013.01); *G06F 1/1641* (2013.01); *H04M 1/0216* (2013.01); *H04M 1/0237* (2013.01); *H04M 2250/16* (2013.01)

(58) Field of Classification Search
CPC .. G06F 1/1647; G06F 1/1652; G06F 1/1641; G06F 1/1616; G06F 1/1624; H04M 1/0216; H04M 2250/16; H04M 1/0237
USPC ........... 361/679.01, 679.06, 679.21, 679.27, 361/679.28; 345/1.1–1.3, 901, 905
See application file for complete search history.

(56) References Cited

U.S. PATENT DOCUMENTS

| 5,189,632 | A | * | 2/1993 | Paajanen | G06F 1/1616 455/556.2 |
|---|---|---|---|---|---|
| 5,710,576 | A | * | 1/1998 | Nishiyama | G08B 3/1058 345/169 |
| 7,515,406 | B2 | * | 4/2009 | Kee et al. | 361/679.21 |
| 2004/0021639 | A1 | * | 2/2004 | Hara | 345/168 |
| 2006/0056143 | A1 | * | 3/2006 | Tatsukami et al. | 361/683 |
| 2007/0076861 | A1 | * | 4/2007 | Ju | 379/433.01 |
| 2007/0164923 | A1 | * | 7/2007 | Kanai et al. | 345/1.1 |
| 2008/0079656 | A1 | * | 4/2008 | Kee et al. | 345/1.3 |
| 2008/0253073 | A1 | * | 10/2008 | Kee et al. | 361/681 |
| 2009/0104931 | A1 | * | 4/2009 | Chiang | 455/556.1 |
| 2009/0219249 | A1 | * | 9/2009 | Hara | G06F 1/1616 345/168 |
| 2009/0322690 | A1 | | 12/2009 | Hiltunen et al. | 345/173 |
| 2010/0007576 | A1 | * | 1/2010 | Demuynck et al. | 345/1.3 |
| 2010/0016038 | A1 | * | 1/2010 | Demuynck et al. | 455/575.3 |
| 2010/0093409 | A1 | * | 4/2010 | Jokinen et al. | 455/575.4 |
| 2011/0216064 | A1 | * | 9/2011 | Dahl et al. | 345/428 |
| 2012/0019482 | A1 | * | 1/2012 | Wang | 345/175 |
| 2012/0033353 | A1 | * | 2/2012 | Huang | 361/679.01 |
| 2012/0307423 | A1 | * | 12/2012 | Bohn et al. | 361/679.01 |
| 2013/0010405 | A1 | * | 1/2013 | Rothkopf et al. | 361/679.01 |

* cited by examiner

*Primary Examiner* — Adrian S Wilson
*Assistant Examiner* — Abhishek Rathod
(74) *Attorney, Agent, or Firm* — Harrington & Smith (57) ABSTRACT

An apparatus including a first electrical display; and a second electrical display movably connected to the first electrical display between a first configuration and a second configuration. In the first configuration the first and second electrical displays generally face each other. In the second configuration the first and second electrical displays do not generally face each other and are viewable from a same direction. The first and second electrical displays are sized and shaped such that in the first configuration a portion of the second electrical display is visible.

21 Claims, 8 Drawing Sheets

OVERLAPPING DISPLAYS

BACKGROUND

1. Technical Field

The exemplary and non-limiting embodiments relate generally to electrical displays and, more particularly, to a multi-display apparatus and method.

2. Brief Description of Prior Developments

Folding hand-held electronic devices having at least two displays are known. A connection, such as a hinge, is ordinarily provided between housing sections to allow the device to flip open and closed. As hand-held electronic devices are getting smaller, it can be difficult for a user to properly see information on a display of the device. It is known to use multiple stationary displays together to show different portions of a single image. However, spacing between the displays, such as by housings containing the displays, is clearly visible and disrupts the perception of the image to the user.

SUMMARY

The following summary is merely intended to be exemplary. The summary is not intended to limit the scope of the claims.

In accordance with one aspect, an apparatus is provided including a first electrical display; and a second electrical display movably connected to the first electrical display between a first configuration and a second configuration. In the first configuration the first and second electrical displays generally face each other. In the second configuration the first and second electrical displays do not generally face each other and are viewable from a same direction. The first and second electrical displays are sized and shaped such that in the first configuration a portion of the second electrical display is visible.

In accordance with another aspect, an apparatus is provided comprising a first section comprising a first electrical display; a second section comprising a second electrical display; and a connection movably connecting the first and second sections to each other between a closed configuration and an open configuration. In the closed configuration the second electrical display is only partially viewable. In the open configuration both the first and the second electrical displays are viewable from a same direction. In the open configuration a portion of the first electrical display overlaps a portion of the second electrical display such that the portion of the second electrical display is viewable through the portion of the first electrical display.

In accordance with another aspect, a method comprises moving a second section of an apparatus relative to a first section of the apparatus from a closed configuration, where the first section comprises a first electrical display, where the second section comprises a second electrical display, where the first and Second electrical displays generally face each other in the closed configuration, and where in the closed configuration the first and second electrical displays are sized and shaped such that a portion of the second electrical display is visible beyond an end of the first section; and moving the second section relative to the first section to an open configuration, where the first and second electrical displays generally face a same direction, In accordance with another aspect, a method comprises providing a first section with a first electrical display; providing a second section with a second electrical display; and rotatably connecting the first section to the second section at a joint between a closed configuration and an open configuration. In the open configuration a portion of the first electrical display overlaps a portion of the second electrical display such that the portion of the second electrical display is viewable through the portion of the first electrical display.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Figure 1:
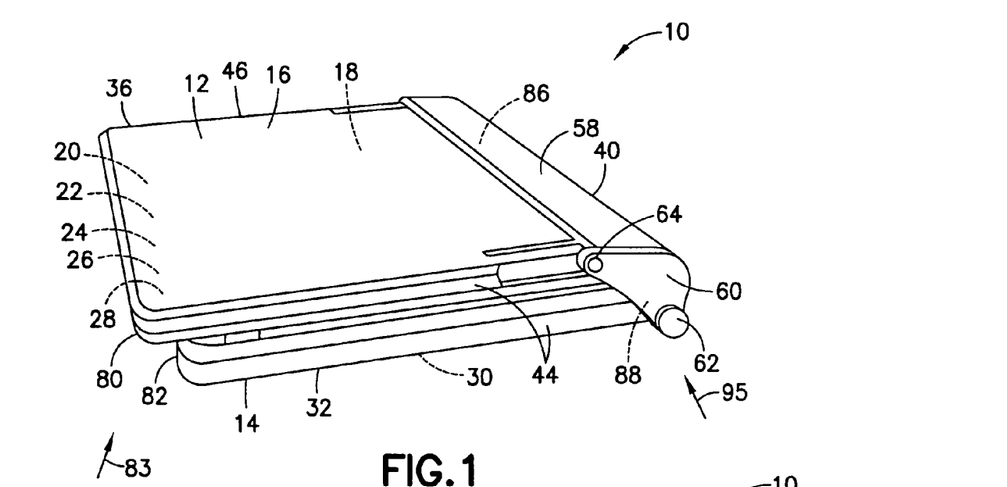
FIG. 1 is a perspective view of an example embodiment in a closed configuration.

Referring to FIG. 1, there is shown a perspective view of an apparatus 10 incorporating features of an example embodiment. Although the features will be described with reference to the example embodiments shown in the drawings, it should be understood that features can be embodied in many alternate forms of embodiments. In addition, any suitable size, shape or type of elements or materials could be used.

Figure 2:
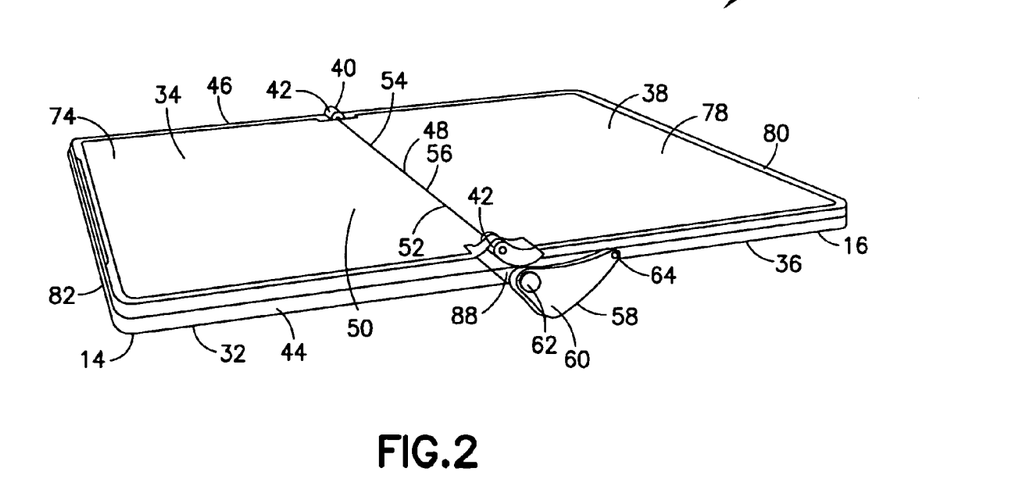
FIG. 2 is a perspective view of the example shown in FIG. 1 is an open configuration.

The apparatus 10 is a hand-held portable electronic device. The apparatus 10 can comprise, for example, a telephone application, Internet browser application, camera application, video recorder application, music player and recorder application, email application, navigation application, gaming application, and/or any other suitable electronic device application. The apparatus 10, in this example embodiment, comprises a housing 12 which is adapted to be reconfigured into different configurations. The apparatus 10 comprises a first section 14 movably connected to a second section 16. The first and second sections 14, 16 can be moved relative to each other to obtain the different configurations. FIG. 1 shows the apparatus 10 in a closed, folded configuration. FIG. 2 shows the apparatus in an open, unfolded configuration.

Electronic circuitry 18 is located in the first and second sections 14, 16. The circuitry 18 can comprises, for example, a receiver 20, a transmitter 22, a controller 24 which can include at least one processor 26, at least one memory 28, and software. A rechargeable battery 30 is also provided to power the apparatus 10. However, all of these features are not necessary to implement the features described below. Thus, for example, features could be used in any suitable type of device, such as a telephone, a hand-held game, a television remote control, a cable box remote control, a PDA, a laptop computer, or a folding tablet-type computer device for example. Portions of the electronic circuitry 18 or other components could also be on or in the cover 58. For example, the cover 58 could comprise keys, sensors, a camera, a speaker, etc.

Referring to FIGS. 1-2, the first section 14 generally comprises a first housing section 32 of the housing 12 and a first display 34. The second section 16 generally comprises a second housing section 36 of the housing 12 and a second display 38. The first and second sections 14, 16 are movably connected to each other by a connection 40. In an alternate example embodiment one or more additional displays could be provided on the back side of the housing sections 32 and/or 36 to be viewable while the apparatus is in the closed configuration.

In the example embodiment shown, the first and second displays 34, 38 are substantially the same. However, in alternate embodiments they could be different. Each display 34, 38 comprises an LCD electronic display. However, in alternate embodiments any suitable type of electronic display could be provided. Each display 34, 38 in this example is a touch screen display which functions as both a display screen and as a user input. However, features described herein could be used as either display 34, 38 which does not have a touch, user input feature. A display screen section of each display 34, 38 is connected to a display driver of the circuitry 18. A touch screen section of each display 34, 38 is connected to a touch screen controller of the circuitry 18. The display drivers and touch screen controllers are connected to the controller 24.

Figure 3:
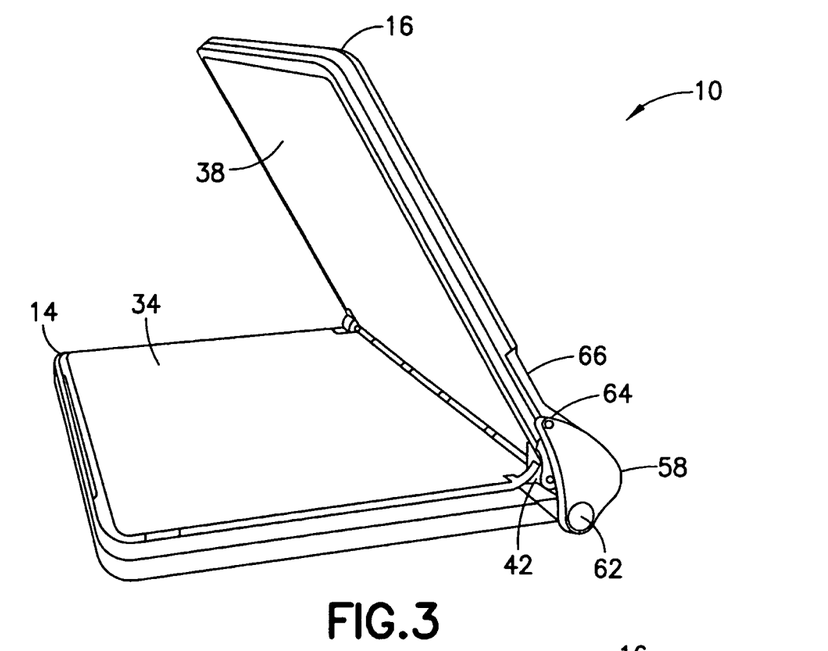
FIG. 3 is a perspective view of the example shown in FIG. 1 is an intermediate position between the open and closed positions shown in FIGS. 1 and 2.
Figure 4:
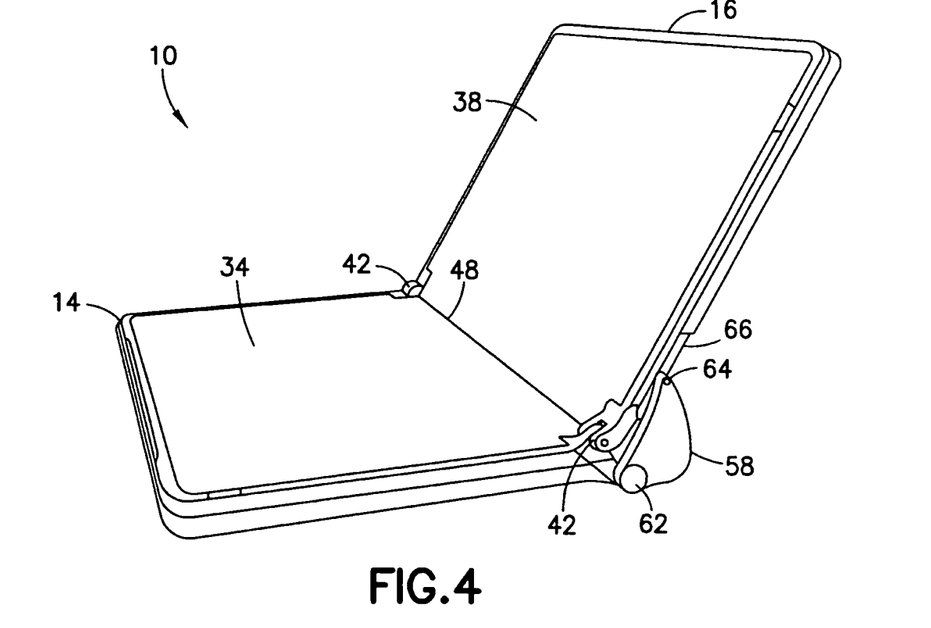
FIG. 4 is a perspective view of the example shown in FIG. 1 is another intermediate position between the open and closed positions shown in FIGS. 1 and 2.

Referring also to FIGS. 3-4, the apparatus 10 is shown at intermediate configurations between the fully open and closed configurations shown in FIGS. 1 and 2. The connection 40 might comprise a position retention system to retain the second section 16 at the relative position shown in FIG. 4 for use of the apparatus similar to a laptop computer. In this use, a virtual soft keyboard could be displayed on the first display 34 with the second display 38 functioning as a computer monitor. However, a position retention system need not be provided, and any suitable software use of the electronic displays 34, 38 could be provided. In one type of alternate example, the apparatus might not comprise the first display 34. Instead, the first section 14 might comprise a real keypad and only the second section would comprise a display (the display 38).

The movable connection 40 in this example comprises two hinges 42 located at opposite sides 44, 46 of the housing sections 32, 36 at the joint 48 between the first and second sections 14, 16. The connection 40 in one example could comprise the connection described in U.S. patent application Ser. No. 13/307,423 filed Nov. 30, 2011, which is hereby incorporated by reference in its entirety. The first display 34 has an end 50 with an edge 52 located at the joint 48. Likewise, the second display 38 has an end 54 with an edge 56 located at the joint 48. The hinges 42 are not located between the edges 52, 56. The hinges 42 are located outside of the area between the edges 52, 56. This allows the ends 50, to be positioned very close to each other in the unfolded, open configuration; and perhaps touch each other. Because the hinges 42 are not located in the gap between the ends 50, 54 of the displays, the ends of the displays can be located much closer to each other than in conventional devices; without portions of the housings 32, 36 between the edges 52, 56. At least portions of the end edges 52, 56 can directly face each other without portions of the housing between the opposing edges.

Electrical conductors extend between the two sections 14, 16 through the joint 48. A cover 58 is provided to protect and enclose those conductors, and to protect the edges 52, 56 of the displays 34, 38 when the apparatus 10 is in the folded, closed configuration. In this example, the cover 58 has side sections 60 with a first end 62 pivotably connected to the first housing section 36, and a second end 64 slidably connected to the second housing section 36 in the slots or tracks 66. The second end 64 can rotate in the slot 66.

Figure 5:
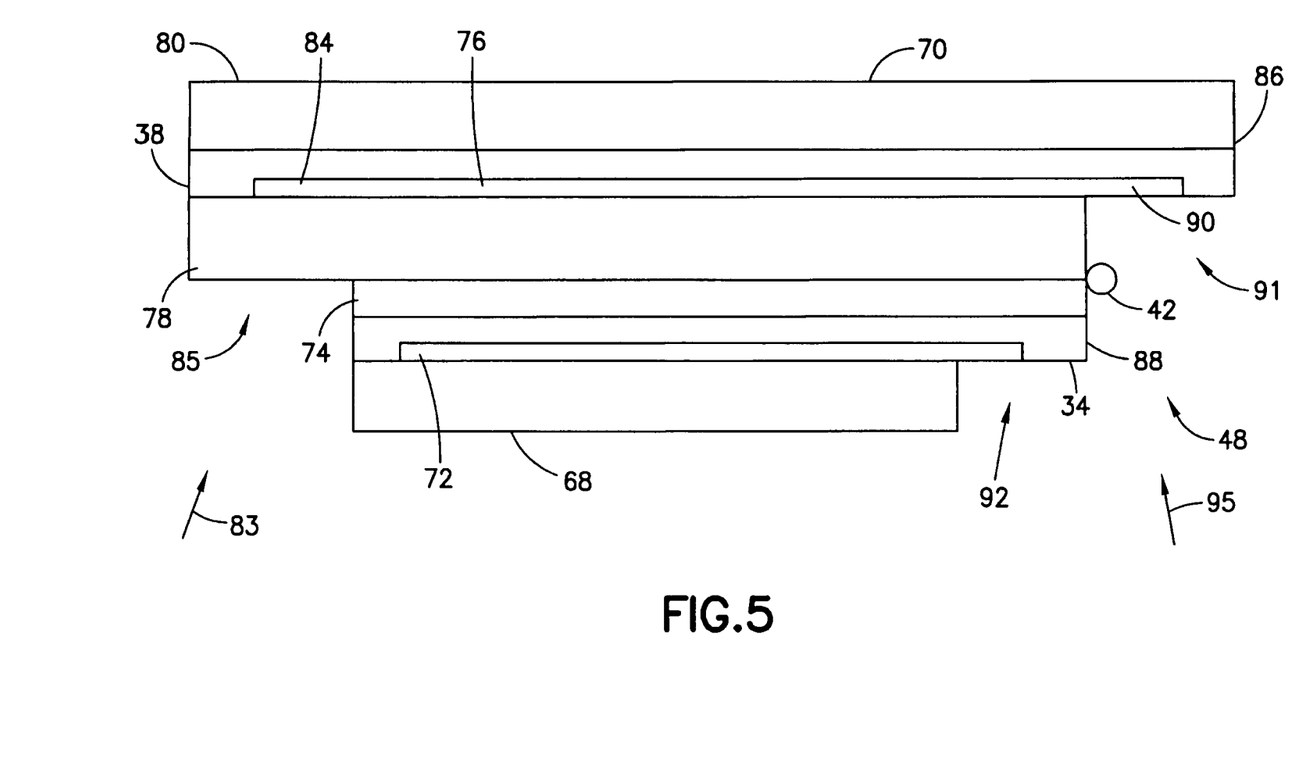
FIG. 5 schematically illustrates some of the components of the apparatus in the closed configuration shown in FIG. 1.
Figure 6:
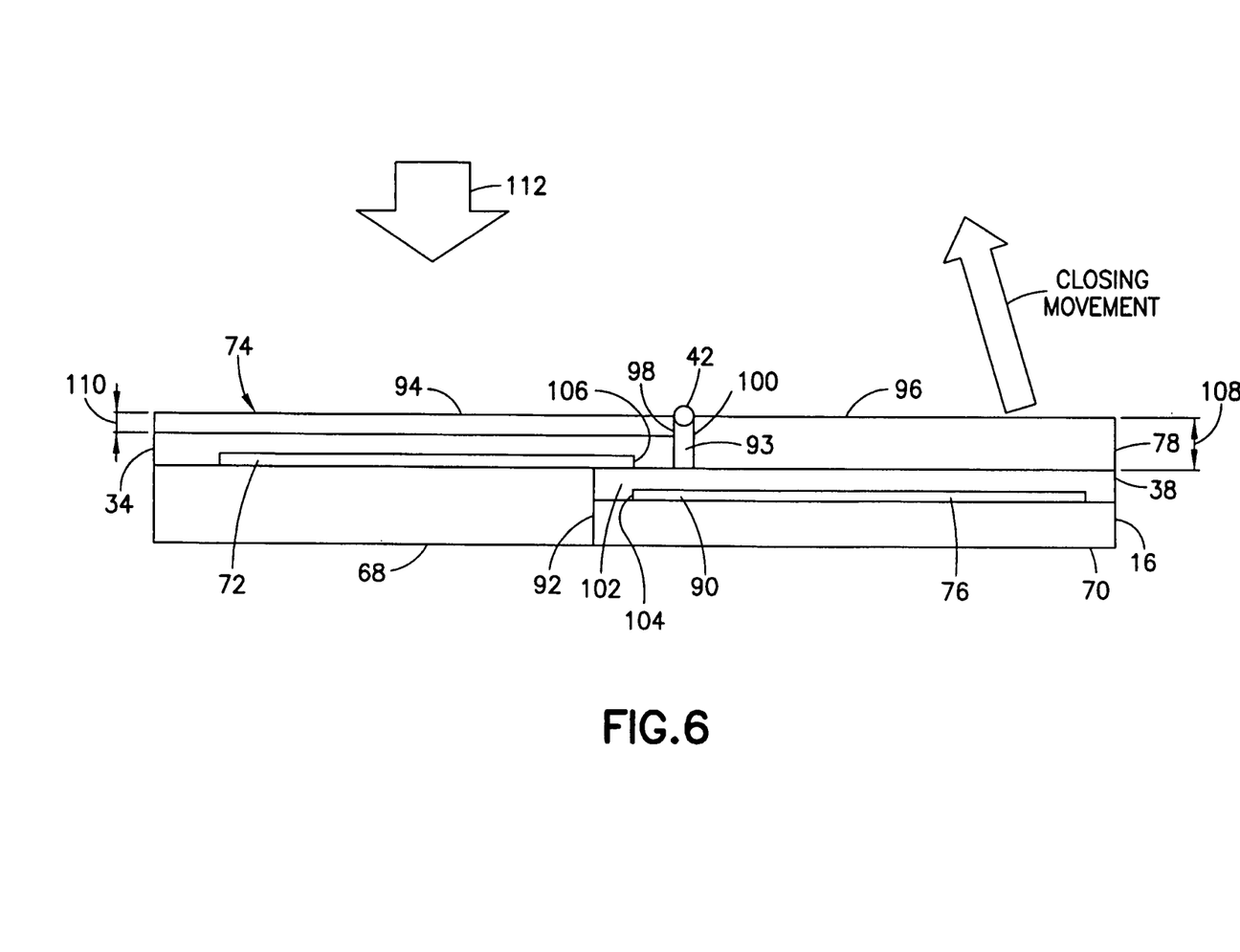
FIG. 6 schematically illustrates some of the components of the apparatus in the open configuration shown in FIG. 2.

Referring also to FIGS. 5-6, FIG. 5 shows components of the apparatus while at the first, closed configuration shown in FIG. 1. FIG. 6 shows those components while at the second, open configuration shown in FIG. 2. Engine block 68 generally symbolizes the circuitry 18 in the first section 14. Engine block 70 generally symbolizes the circuitry 18 in the second section 16. The first electrical display 34 is connected to the first housing section 32 and located above the first engine block 68. The first electrical display 34 generally comprises a first display active area 72 and a first window 74 on the first display active area 72. The first display active area 72 comprises the functional display and/or touch components, while the window 74 is generally protective in nature. The second electrical display 38 is connected to the second housing section 36. The second engine block 70 is contained between the second electrical display 38 and the second housing section 36. The second electrical display 38 generally comprises a second display active area 76 and a second window 78 on the second display active area 76. The second display active area 76 comprises the functional display and/or touch components, while the window 78 is generally protective in nature.

In the closed, folded configuration shown in FIGS. 5 and 1, the two windows 74, 78 are located directly opposite each other. The two displays 34, 38 generally face each other, and thereby protect each other. The two sections 14, 16 can pivot open relative to each other at the hinges 42. In the closed configuration shown in FIG. 1, a portion 80 of the second section 16 extends past the end 82 of the first section 14. This allows the portion 84 (see FIG. 5) of the second display active section 76 to be visible from direction 83 at location 85 when the apparatus is closed. In addition, an opposite portion 86 of the second section 16 extends past the opposite end 88 of the first section 14. This allows the portion 90 of the second display active section 76 to be visible at the location 91; generally at the joint 48 between the two sections 14, 16.

The second window 78 does not extend all the way across the second display active area 76. As seen in FIG. 5, the location 91 does not include the window 78 covering the area 76. Also, the first engine block 68 is intentionally absent from the area 92 behind the first electrical display 34. This area 92 forms a receiving area for receiving the portion 90 of the second display active area 76 (and perhaps part of the second engine block 70 as shown in FIG. 6).

Referring also to FIG. 6, in the unfolded, fully open configuration the second section 16 has been rotated about the hinges 42 about 180 degrees. The top surfaces 94, 96 of the two windows 74, 78 are at substantially the same height.

The second window 78 has a larger thickness 108 than the thickness 110 of the first window 74 to accomplish this same height while still allowing the second display active section 38 to be moved into the area 92 as further described below. A slight gap 93 may be provided at the joint 48 between the opposite ends 98, 100 of the windows 74, 78. However, because the hinges 42 are not located between the displays 34, 38, the ends 98, 100 are located directly opposite each other. A portion 102 of the second electrical display 38 extends into the area 92 (see FIG. 5) behind the first electrical display 34. The portion 90 of the second display active area 76 extend under the gap 93 of the joint 48 and to a location under the first window 74. In this example, the end 104 of the second display active area 76 is located generally aligned with the end 106 of the first display active area 72, but beneath it. However, the ends 104, 106 might not be exactly aligned, such as slightly short of alignment or extending slightly past alignment for example. In addition, rather than the gap 93 being void, one or more very small resilient rubber or polymer member could be provided in the gap 93 (perhaps attached to one or both windows 74, 78 which is/are perhaps sandwiched between the edges 98, 100 when the apparatus is configured into the open configuration.

With this type of configuration, the two display active areas 72, 76 can be used together to individually display different portions of a single image. In the open configuration shown in FIG. 6, both displays 34, 38 can be viewed together from the same viewing direction 112. Although two displays 34, 38 are used to display different portions of the single image, because the displays 34, 38 overlap and because the window ends 98, 100 are so close together, there is very little image separation or distinction to the user. To the user, the two displays 34, 38 can be used together as an equivalent single display. This allows for a smaller form factor while still providing a relative larger display for a foldable/collapsible apparatus.

An example embodiment comprising features described herein can provide a dual-display or multi-display concept with minimum deadband proximate the joint 48 by using display overlapping. Overlapping minimizes the deadband area between two displays. Also, overlapping generates small display area 91 what can be seen in the closed position. Conventional thin film transistor liquid crystal displays (TFT-LCD) and organic light-emitting diode (OLED) displays are made of glass, and cannot be overlapped due to deadband area non-transparency and easy glass breakage. Features described above enable display overlapping and deadband area miniaturization.

In addition, a secondary display area 91 can be provided in a folded, closed position. This area 91 can be left visible when the apparatus 10 is in its closed position, such as if the cover 58 does not cover it. This gives a nice opportunity to show some information from the display 38, for example a calendar or clock, while the apparatus is closed. The concept is one option for a dual display product. The structure enables also as small a gap 93 as possible between the two displays. The pivot point between the two sections 14, 16 is not in a convention place directly between the two displays. The connection 40 connects the two sections 14, 16, but it has been brought further away from the joint such that the movement connection 40 is not directly located between the two displays 34, 38.

Figure 7:
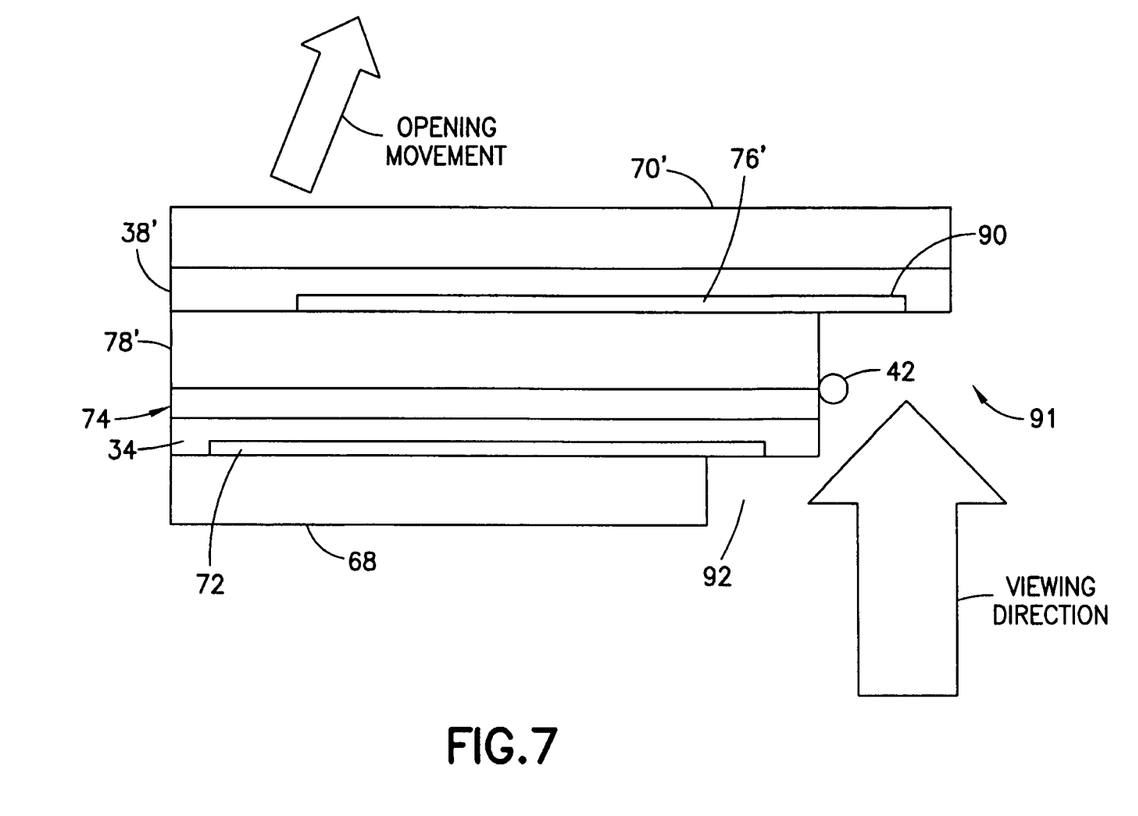
FIG. 7 schematically illustrates some of the components of an alternate example apparatus in the closed configuration similar to FIG. 5.

Referring also to FIG. 7, an alternate example embodiment is shown. Similar to FIG. 5, the illustration shows an apparatus in a folded, closed configuration. This embodiment is identical to the embodiment shown in FIGS. 1-6 except the size of the second section is shorter such that there is no overhang portion 80. Thus, this example illustrates that the location 85 need not be provided for viewing the portion 84 of the second display active area 76. However, the location 91 for viewing the portion 90 is still provided in this example. In an alternate example this feature might not be provided, such as when the cover 58 covers the location 91 in the closed configuration. The first electronic display 34 and engine block 68 are the same as shown in FIG. 5. The second electronic display 38' (with window 78' and display active area 76') and engine block 70' are merely shorter in length.

Figure 8:
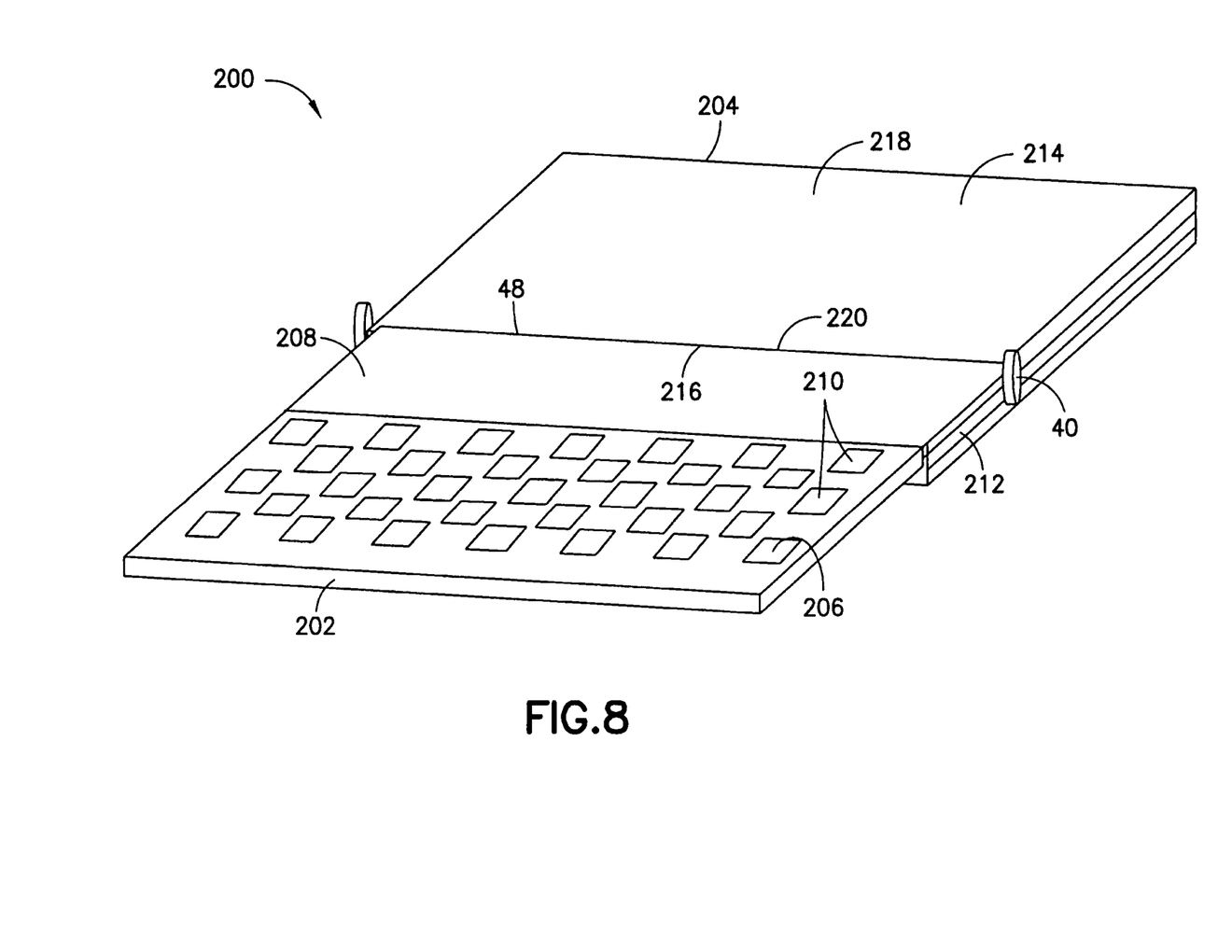
FIG. 8 is a perspective view of another example in an open configuration.

Referring also to FIG. 8, another alternate example embodiment is shown. The apparatus 200 comprises a first section 202 and a second section 204. FIG. 8 shows the apparatus 200 in an open unfolded configuration similar to FIG. 2. A connection 40 is provided to allow the second section 204 to rotate between the open configuration and a folded, closed configuration similar to FIG. 1. The first section 202 comprises a keypad 206 and a first window 208. The keypad 206 is shown as a keyboard with keys 210 in this example. The window 208 could be merely a window, or a window of a first electrical display (similar to display 34 but merely shorter than the display 34 shown in FIG. 2). The second section 204 is the same as the second section 16 except the portion 212 of the electronic display 214 is longer than the portion 102. This allows the portion 212 to extend farther inward past the edge 216 of the display portion 208. The second window 218 of the display 214 can have its edge 220 located directly opposite the edge 216 of the window 208. Thus, this example illustrates that the display active area of the display 214 can use two windows 208 and 218, and the apparatus does not necessarily need to use two electronic displays with the two windows. However, the portion 212 can still be viewable in the closed configuration similar to the portion 90 shown in FIGS. 5 and 7. The single display active area of the display 214 bridges the gap at the joint 48 under the two edges 216, 220.

Figure 9:
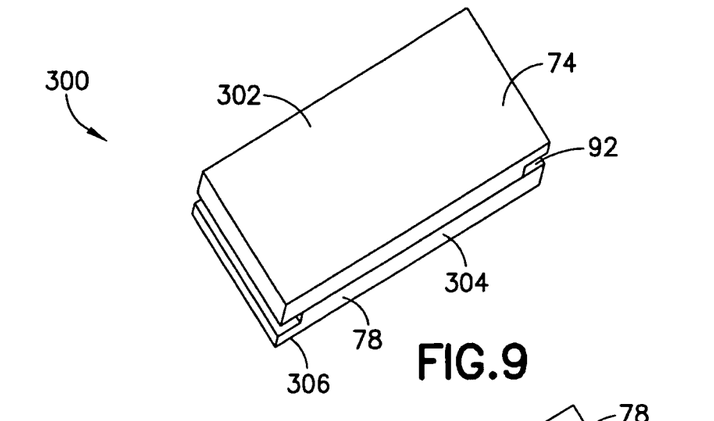
FIG. 9 is a schematic perspective view of another example in a closed configuration.
Figures 10, 11:
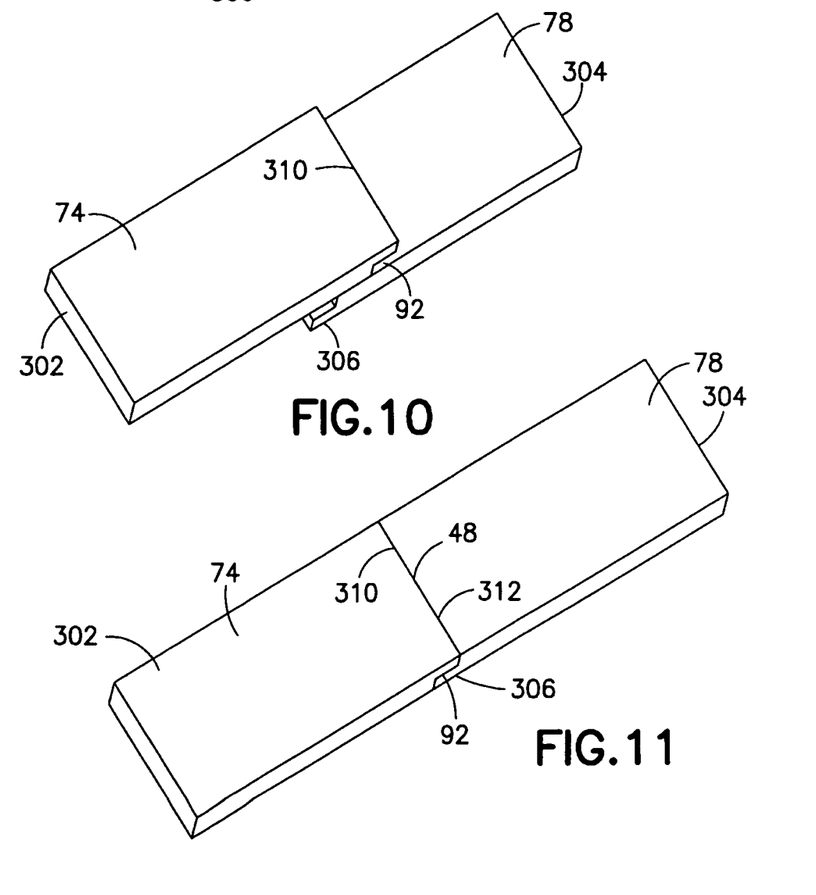
FIG. 10 is a schematic perspective view of the example shown in FIG. 9 in an intermediate position.
FIG. 11 is a schematic perspective view of the example shown in FIGS. 9-10 in an open configuration.

FIGS. 9-11 illustrate another example embodiment where an apparatus 300 has two electrical displays 302, 304 movably connected to each other. The first display 302 is slideably connected to the second display 304 from a first closed position as shown in FIG. 9 to a second open position as shown in FIG. 11. Similar to that shown in FIGS. 5 and 7, the first display 302 has an area 92 formed by the window 74 extending past the end of the rest of the first display. Also similar to FIGS. 5 and 7, the second window 78 does not extend all the way across the rest of the second display. Thus, portion 306 of the second display active area can be located in the area 92 in the open configuration shown in FIG. 11 to be protected by the first window 74 and also span across the joint 48 of the two windows.

As the two displays 302, 304 approach the fully open position, the two displays translate into a generally same plane; with motion generally perpendicular to the first sliding motion. The two edges 310, 312 are, thus, positioned directly opposite each other and protect each other. This allows the two displays to look like a single display because the edges 310, 312 directly face each other without portions of the housings therebetween.

In accordance with one example, an apparatus 10 is provided comprising a first electrical display 34; and a second electrical display 38 movably connected to the first electrical display between a first configuration (FIG. 1) and a second configuration (FIG. 2). In the first configuration the first and second electrical displays generally face each other. In the second configuration the first and second electrical displays do not generally face each other and are viewable from a same direction 112. The first and second electrical displays are sized and shaped such that in the first configuration a portion (84 and/or 90) of the second electrical display is visible.

The first and second electrical displays may be connected to each other by a connection 40 comprising a pivot 42 such that the second electrical display is adapted to pivot relative to the first electrical display between the first and second configurations. The first electrical display 34 may comprise a first display active area 72 covered by a first window 74, where the second electrical display 38 may comprise a second display active area 76 covered by a second window 78, and where the windows 74, 78 are located directly opposite each other in the first configuration. The portion of the second electrical display comprises a portion 90 of the second display active area which is not covered by the second window. The portion 90 of the second display active area may be covered by the first window 74 in the second configuration. The portion 90 of the second display active area 76 may extend between a joint 48 under the first and second windows 74, 78 in the second configuration. The first electrical display 34 may comprise a first display active area 72, where the second electrical display 38 comprises a second display active area 76, and where end edges 104, 106 of the first and second display active areas are substantially aligned in the second configuration one beneath the other. In the first configuration, the portion 90 of the second display active area may extend at least partially under a joint 48/93 between the first and second electrical displays. In the first configuration, the portion 90 of the second electrical display may be located in a plane beneath the first electrical display 34. Another opposite portion 80 of the second electrical display 38 may be visible in the first configuration. In the second configuration a portion of the first electrical display 34 overlaps the portion 90 of the second electrical display such that the portion of the second electrical display is viewable through the portion of the first electrical display.

In another example, an apparatus 10 may be provided comprising a first section 14 comprising a first electrical display 34; a second section 16 comprising a second electrical display 38; and a connection 40 movably connecting the first and second sections to each other between a closed configuration (FIG. 1) and an open configuration (FIG. 2), where in the closed configuration the second electrical display 38 is only partially viewable, where in the open configuration both the first and the second electrical displays 34, 38 are viewable from a same direction 112, and where in the open configuration a portion of the first electrical display 34 overlaps a portion 90 of the second electrical display such that the portion 90 of the second electrical display is viewable through the portion of the first electrical display.

The portion of the first electrical display may comprise a window 74 of the first electrical display which overlies a first display active area 72 of the first electrical display in the open configuration. The first electrical display may comprise a first display active area 72, where the second electrical display comprises a second display active area 76, and where end edges 104, 106 of the first and second display active areas are substantially aligned in the open configuration one beneath the other. In the open configuration, the portion 90 of the second electrical display extends at least partially under a joint 48/93 between the first and second electrical displays. The portion 90 of the second electrical display may be viewable in the closed configuration. The portion 90 may be located proximate a joint 48 forming the connection 40 of the first and second sections. The apparatus may comprise means for viewing the portion 90 of the second electrical display in the closed configuration, and the connection 40 comprising means for rotating the second section relative to the first section.

Figure 12:
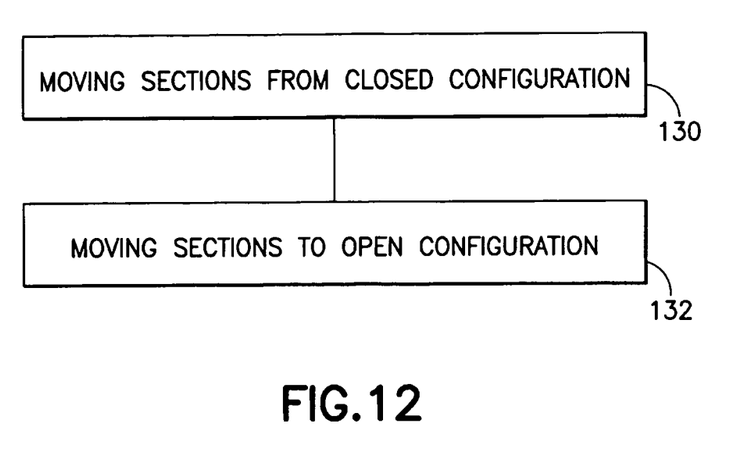
FIG. 12 is a diagram illustrating steps of an example method.

An example method comprises moving a second section of an apparatus relative to a first section of the apparatus from a closed configuration as indicated by block 130 in FIG. 12, where the first section comprises a first electrical display, where the second section comprises a second electrical display, where the first and second electrical displays generally face each other in the closed configuration, and where in the closed configuration the first and second electrical displays are sized and shaped such that a portion of the second electrical display is visible beyond an end of the first section; and moving the second section relative to the first section to an open configuration as indicated by block 132 in FIG. 12, where the first and second electrical displays generally face a same direction.

Figure 13:
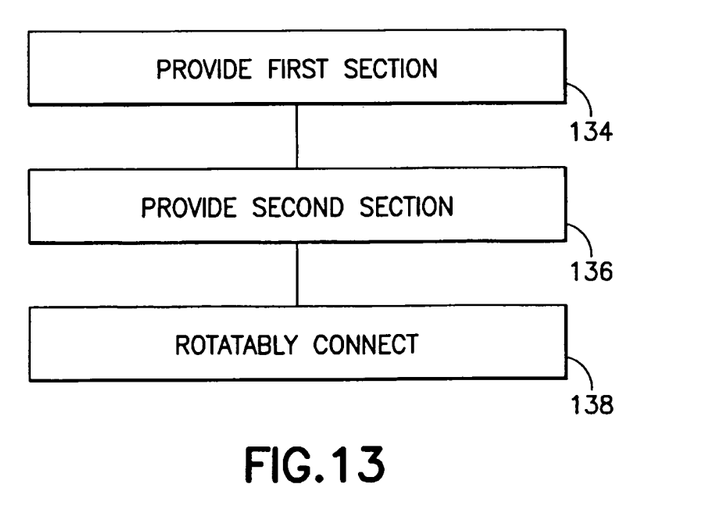
FIG. 13 is a diagram illustrating steps of another example method.

An example method comprises providing a first section with a first electrical display as indicated by block 134 in FIG. 13; providing a second section with a second electrical display as indicated by block 136 in FIG. 13; and rotatably connecting the first section to the second section at a joint between a closed configuration and an open configuration as indicated by block 138 in FIG. 13, where in the open configuration a portion of the first electrical display overlaps a portion of the second electrical display such that the portion of the second electrical display is viewable through the portion of the first electrical display.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. An apparatus comprising:
   first engine block comprising first circuitry;
   a first electrical display, where the first engine block is located against a first side of the first electrical display;
   a second engine block comprising second circuitry; and
   a second electrical display movably connected at a proximal end thereof at a single joint of rotation to a proximal end of the first electrical display between a first configuration and a second configuration, where the second engine block is located against a first side of the second electrical display,
   the first configuration being a fully closed configuration with the first and second electrical displays facing each other,
   where in the second configuration the first and second electrical displays do not generally face each other and are viewable from a same direction, and
   where the first and second electrical displays are sized and shaped such that in the first configuration a portion of a distal end of the second electrical display is visible to a user,
   where the first electrical display comprises a first display active area covered by a first window, where the first window is located against a second side of the first electrical display which is opposite the first side of the first electrical display, where the second electrical display comprises a second display active area only partially covered by a second window such that a portion of the second display active area is not covered by the second window, where the second window is located against a second side of the second electrical display which is opposite the first side of the second electrical display, and where the windows are located directly opposite each other in the first configuration, and where the first and second engine blocks prevent the first and second electrical displays from being viewed through the first and second engine blocks.

2. The apparatus of claim 1 where the first and second electrical displays are connected to each other by a connection comprising a pivot such that the second electrical display is adapted to pivot relative to the first electrical display between the first and second configurations.

3. The apparatus of claim 1 where in the first configuration the portion of the second display active area, which is not covered by the second window, is viewable.

4. An apparatus as in claim 1 where, in the fully closed configuration, the first electrical display covers a majority of the second electrical display.

5. The apparatus of claim 1 where the portion of the second display active area is covered by the first window in the second configuration.

6. The apparatus of claim 1 where the portion of the second display active area extends between a joint under the first and second windows in the second configuration.

7. The apparatus of claim 1 where end edges of the first and second display active areas are substantially aligned in the second configuration one beneath the other.

8. The apparatus of claim 7 where, in the first configuration, the portion of the second display active area extends at least partially under a joint between the first and second electrical displays.

9. The apparatus of claim 7 where, in the first configuration, the portion of the second electrical display is located in a plane beneath the first electrical display.

10. The apparatus of claim 1 where another opposite portion of the second electrical display is visible in the first configuration.

11. The apparatus of claim 1 where in the second configuration a portion of the first electrical display overlaps the portion of the second electrical display such that the portion of the second electrical display is viewable through the portion of the first electrical display.

12. An apparatus comprising:
a first section comprising a first engine block comprising first circuitry, and a first electrical display, where the first electrical display comprises a first display active area and a first window, where the first engine block is located against a first side of the first electrical display, and where the first window is located against a second side of the first electrical display which is opposite the first side of the first electrical display;
a second section comprising a second engine block comprising second circuitry, and a second electrical display, where the second electrical display comprises a second display active area and a second window, where the second engine block is located against a first side of the second electrical display, where the second window is located against a second side of the second electrical display which is opposite the first side of the second electrical display; and
a connection movably connecting respective proximal ends of the first and second sections to each other between a fully closed configuration and an open configuration, where the connection comprises a single joint of rotation between the first and second sections, where in the fully closed configuration the first and second electrical displays are facing each other, a portion of a distal end of the second electrical display is viewable by a user, and the second electrical display is only partially viewable by the user, where in the open configuration both the first and the second electrical displays are viewable from a same direction, and where in the open configuration a portion of the first electrical display overlaps a portion of the second display active area such that the portion of the second display active area is viewable through the portion of the first electrical display, and where the portion of the second display active area is viewable in the fully closed configuration through neither the first nor second windows, and where the first and second engine blocks prevent the first and second electrical displays from being viewed through the first and second engine blocks.

13. An apparatus as in claim 12 where, in the fully closed configuration, the first electrical display covers a majority of the second electrical display.

14. The apparatus of claim 12 where end edges of the first and second display active areas are substantially aligned in the open configuration one beneath the other.

15. The apparatus of claim 12 where, in the open configuration, the portion of the second display active area extends at least partially under a joint between the first and second electrical displays.

16. The apparatus of claim 12 where the portion of the second display active area is located proximate a joint forming the connection of the first and second sections.

17. The apparatus of claim 12 comprising means for viewing the portion of the second display active area in the closed configuration, and the connection comprises means for rotating the second section relative to the first section.

18. A method comprising:
moving a second section of an apparatus relative to a first section of the apparatus from a fully closed configuration,
where the first section is movably connected at a proximal end thereof to a proximal end of the second section by a single joint of rotation,
where the first section comprises a first engine block comprising first circuitry, and a first electrical display, where the first electrical display comprises a first display active area and a first window, where the first engine block is located against a first side of the first electrical display, and where the first window is located against a second side of the first electrical display which is opposite the first side of the first electrical display,
where the second section comprises a second engine block comprising second circuitry, and a second electrical display comprising a second display active area and a second window, where the second engine block is located against a first side of the second electrical display , where the second window is located against a second side of the second electrical display which is opposite the first side of the second electrical display,
where the first and second engine blocks prevent the first and second electrical displays from being viewed through the first and second engine blocks, where the second window does not cover a portion of the second display active area, where the first and second electrical displays face each other in the fully closed configuration, and where in the fully closed configuration the first and second electrical displays are sized and shaped such that the portion of a distal end of the second display active area that is distally beyond a distal end of the first section is visible to a user; and moving the second section relative to the first section to an open configuration, where the first and second electrical displays generally face a same direction.

19. A method as in claim 18 where the first electrical display covers a majority of the second electrical display in the fully closed configuration.

20. A method comprising:

providing a first section with a first engine block comprising first circuitry, and a first electrical display, where the first electrical display comprises a first display active area and a first window, where the first engine block is located against a first side of the first electrical display, and where the first window is located against a second side of the first electrical display which is opposite the first side of the first electrical display;

providing a second section with a second engine block comprising second circuitry, and a second electrical display, where the second electrical display comprises a second display active area and a second window, where a portion of the second display active area is not covered by the second window, where the second engine block is located against a first side of the second electrical display, where the second window is located against a second side of the second electrical display which is opposite the first side of the second electrical display; and rotatably connecting a proximal end of the first section to a proximal end of the second section at a single joint of rotation between a fully closed configuration and an open configuration, where in the open configuration a portion of the first electrical display overlaps the portion of the second display active area such that the portion of the second display active area is viewable through the portion of the first electrical display, and where in the fully closed configuration the first and second electrical displays face each other and a portion of a distal end of the second display active area is viewable, by a user, distally past a distal end of the first section, and where the first and second engine blocks prevent the first and second electrical displays from being viewed through the first and second engine blocks.

21. A method as in claim 20 where the first electrical display covers a majority of the second electrical display in the fully closed configuration.

* * * * *

UNITED STATES PATENT AND TRADEMARK OFFICE
CERTIFICATE OF CORRECTION

| | | |
|---|---|---|
| PATENT NO. | : 9,507,376 B2 | Page 1 of 1 |
| APPLICATION NO. | : 13/325294 | |
| DATED | : November 29, 2016 | |
| INVENTOR(S) | : Mikael Kontkanen et al. | |

It is certified that error appears in the above-identified patent and that said Letters Patent is hereby corrected as shown below:

In the Claims

In Claim 1:

Column 8, Line 43, "first" should be deleted and -- a first -- should be inserted.

Signed and Sealed this
Third Day of January, 2017

Michelle K. Lee
*Director of the United States Patent and Trademark Office*